United States Patent
Curran et al.

(10) Patent No.: US 10,711,363 B2
(45) Date of Patent: Jul. 14, 2020

(54) ANODIC OXIDE BASED COMPOSITE COATINGS OF AUGMENTED THERMAL EXPANSIVITY TO ELIMINATE THERMALLY INDUCED CRAZING

(71) Applicant: Apple Inc., Cupertino, CA (US)

(72) Inventors: James A. Curran, Morgan Hill, CA (US); William A. Counts, Sunnyvale, CA (US); Zechariah D. Feinberg, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 355 days.

(21) Appl. No.: 14/971,829

(22) Filed: Dec. 16, 2015

(65) Prior Publication Data

US 2017/0088968 A1   Mar. 30, 2017

Related U.S. Application Data (60) Provisional application No. 62/232,239, filed on Sep. 24, 2015.

(51) Int. Cl.
  *C25D 11/24*   (2006.01)
  *C25D 11/22*   (2006.01)
  (Continued)

(52) U.S. Cl.
  CPC .............. *C25D 11/246* (2013.01); *C25D 7/00* (2013.01); *C25D 9/02* (2013.01); *C25D 11/20* (2013.01);
  (Continued)

(58) Field of Classification Search
  None
  See application file for complete search history.

(56) References Cited

U.S. PATENT DOCUMENTS

| | | |
|---|---|---|
| 2,888,388 A | 5/1959 | Stiller |
| 3,016,293 A | 1/1962 | Alexander et al. |
| (Continued) | | |

FOREIGN PATENT DOCUMENTS

| | | |
|---|---|---|
| CH | 691064 A5 | 4/2001 |
| CN | 1616709 A | 5/2005 |
| (Continued) | | |

OTHER PUBLICATIONS

Welding Handbook, vol. 5—Materials and Applications, Part 2 (9th Edition), American Welding Socieity, Table 9.1 (2015). (Year: 2015).*

(Continued)

*Primary Examiner* — Scott R. Walshon
*Assistant Examiner* — Elaine M Vazquez
(74) *Attorney, Agent, or Firm* — Dorsey & Whitney LLP (57) ABSTRACT

A process is disclosed for minimizing the difference in thermal expansivity between a porous anodic oxide coating and its corresponding substrate metal, so as to allow heat treatments or high temperature exposure of the anodic oxide without thermally induced crazing. A second phase of higher thermal expansivity than that of the oxide material is incorporated into the pores of the oxide in sufficient quantity to raise the coating's thermal expansion coefficient. The difference in thermal expansion between the anodic oxide coating and underlying metal substrate is reduced to a level such that thermal exposure is insufficient for any cracking to result. The second phase may be an electrodeposited metal, or an electrophoretically deposited polymer. The second phase may be uniformly deposited to a certain depth, or may be deposited at varying amounts among the pores.

8 Claims, 8 Drawing Sheets

(51) Int. Cl.
- C25D 11/20 (2006.01)
- C25D 13/12 (2006.01)
- G06F 1/16 (2006.01)
- G06F 1/20 (2006.01)
- C25D 7/00 (2006.01)
- C25D 9/02 (2006.01)
- H04M 1/02 (2006.01)
- H04M 1/18 (2006.01)

(52) U.S. Cl.
CPC .............. *C25D 11/22* (2013.01); *C25D 13/12* (2013.01); *G06F 1/1613* (2013.01); *G06F 1/1656* (2013.01); *G06F 1/203* (2013.01); *H04M 1/0283* (2013.01); *H04M 1/185* (2013.01)

(56) References Cited

U.S. PATENT DOCUMENTS

| | | |
|---|---|---|
| 3,388,050 A | 6/1968 | Wainer |
| 3,411,994 A | 11/1968 | Wainer |
| 3,715,211 A * | 2/1973 | Quaintance ............ B05D 3/06 101/454 |
| 4,039,355 A | 8/1977 | Takahashi |
| 4,066,516 A | 1/1978 | Sato |
| 4,130,466 A | 12/1978 | Kramer |
| 4,483,751 A | 11/1984 | Murayama et al. |
| 4,518,468 A | 5/1985 | Fotland et al. |
| 4,606,796 A | 8/1986 | Hanazima et al. |
| 4,631,112 A | 12/1986 | Usui et al. |
| 4,756,771 A | 7/1988 | Brodalla et al. |
| 4,856,326 A | 8/1989 | Tsukamoto et al. |
| 4,894,127 A | 1/1990 | Wong et al. |
| 5,066,368 A | 11/1991 | Pasqualoni et al. |
| 5,078,845 A | 1/1992 | Kunugihara et al. |
| 5,277,788 A | 1/1994 | Nitowski et al. |
| 5,336,341 A | 8/1994 | Maejima et al. |
| 5,705,225 A | 1/1998 | Dornfest et al. |
| 5,919,561 A | 7/1999 | Fuchs et al. |
| 6,027,629 A | 2/2000 | Hisamoto et al. |
| 6,339,958 B1 | 1/2002 | Tsui et al. |
| 6,581,446 B1 | 6/2003 | Deneuville et al. |
| 7,527,872 B2 | 5/2009 | Steele et al. |
| 7,732,056 B2 | 6/2010 | Bhatnagar et al. |
| 8,691,403 B2 | 4/2014 | Amakusa et al. |
| 8,950,465 B2 | 2/2015 | Lin et al. |
| 8,962,163 B2 | 2/2015 | Shimao et al. |
| 9,359,686 B1 | 6/2016 | Curran et al. |
| 9,487,879 B2 | 11/2016 | Tatebe et al. |
| 2003/0106201 A1 | 6/2003 | Holloway |
| 2003/0196907 A1 | 10/2003 | Viola |
| 2004/0004003 A1 | 1/2004 | Hesse |
| 2005/0061680 A1 | 3/2005 | Dolan |
| 2005/0106403 A1 | 5/2005 | Yui |
| 2006/0019035 A1 | 1/2006 | Munz |
| 2008/0274375 A1 | 11/2008 | Ng et al. |
| 2008/0283408 A1 | 11/2008 | Nishizawa |
| 2009/0050485 A1 | 2/2009 | Wada et al. |
| 2009/0233113 A1 | 9/2009 | Hisamoto et al. |
| 2010/0024534 A1 | 2/2010 | Li et al. |
| 2010/0264036 A1 | 10/2010 | Hatanaka et al. |
| 2010/0326839 A1 | 12/2010 | Morikawa et al. |
| 2011/0252874 A1 | 10/2011 | Patten et al. |
| 2011/0284383 A1 | 11/2011 | Cabot et al. |
| 2011/0297319 A1 | 12/2011 | Chen et al. |
| 2012/0298513 A1 | 11/2012 | Shimao et al. |
| 2013/0008796 A1 | 1/2013 | Silverman et al. |
| 2013/0153427 A1 | 6/2013 | Tatebe |
| 2013/0156635 A1 | 6/2013 | Lee et al. |
| 2013/0319866 A1 | 12/2013 | Browning et al. |
| 2013/0319872 A1 | 12/2013 | Woodhull et al. |
| 2014/0083861 A1 | 3/2014 | Askin et al. |
| 2015/0090598 A1 | 4/2015 | Tatebe et al. |
| 2016/0060783 A1 | 3/2016 | Curran et al. |
| 2016/0237586 A1 | 8/2016 | Curran et al. |
| 2017/0009364 A1 | 1/2017 | Curran et al. |
| 2017/0051425 A1 | 2/2017 | Curran et al. |
| 2017/0051426 A1 | 2/2017 | Curran et al. |
| 2017/0088917 A1 | 3/2017 | Curran et al. |

FOREIGN PATENT DOCUMENTS

| | | |
|---|---|---|
| CN | 1965618 A | 5/2007 |
| CN | 102333897 A | 1/2012 |
| CN | 102666894 A | 9/2012 |
| CN | 103484737 A | 1/2014 |
| CN | 103484916 A | 1/2014 |
| CN | 103526088 A | 1/2014 |
| EP | 2301760 A2 | 3/2011 |
| JP | H02243794 A | 9/1990 |
| JP | H0347937 A | 2/1991 |
| JP | H04210496 A | 7/1992 |
| JP | 2000313996 A | 11/2000 |
| JP | 2009209426 A | 9/2009 |
| KR | 1020120021616 A | 3/2012 |
| TW | 201522716 A | 6/2015 |

OTHER PUBLICATIONS

PCT Application No. PCT/US2015/025000—International Search Report and Written Opinion dated Jan. 26, 2016.

Garcia-Vergara, S. et al; "Morphology of enriched alloy layers in an anodized Al—Cu alloy" Applied Surface Science, 205 (2003),p. 121-127.

Alwitt, R.S. and R.C. McClung , "Mechanical Properties of Anodized Aluminum Coatings"; Proceedings of the SUR/FIN7 '92, American Electroplaters and Surface Finishers Society, Atlanta, Georgia, Jun. 1992.

Yann Goueffon et al., "Study of Degradation Mechanisms of Black Anodic Films in Simulated Space Environment" URL: http://webcache.googleusercontent.com/search?q=cache:fsJq5LjVTVIJ:esmat.esa.int/materials_news/isme09/pdf/6-Contamination/S8%2520-%2520Goueffon.pdf+&cd=1&hl=en&ct=clnk&gl=us.

Henkel Corporation "Bonderite M-ED 9000 Anodizing Seal (Known as Anoseal 9000)" Technical Process Bulletin issued Jun. 10, 2013.

Ling Hao and B. Rachel Cheng., "Sealing Processes of Anodic Coatings—Past, Present, and Future", Metal Finishing, vol. 98, Issue 12, Dec. 2000, p. 8-18.

PCT Application No. PCT/US2014/053595—International Search Report & Written Opinion dated Jun. 24, 2015.

Habazaki et al., "Nanoscale Enrichments of Substrate Elements in the Growth of Thin Oxide Films", Corrosion Science, vol. 39, No. 4, pp. 731-737, 1997.

Vesborg et al., "Addressing the terawatt challenge: scalability in the supply of chemical elements for renewable energy," RSC Advances, 2, pp. 7933-7947, 2012.

U.S. Appl. No. 14/474,021—Non Final Office Action dated Aug. 27, 2015.

PCT Application No. PCT/US2015/010736—International Search Report & Written Opinion dated Nov. 29, 2015.

PCT Application No. PCT/US2015/024349—International Search Report & Written Opinion dated Dec. 17, 2015.

European Patent Application No. 16150283.6—European Search Report dated Jun. 9, 2016.

International Patent Application No. PCT/US2016/043256—International Search Report and Written Opinion dated Oct. 12, 2016.

Taiwanese Patent Application No. 105125818—Office Action dated Jul. 6, 2017.

Chinese Application for Invention No. 201610011395.4—First Office Action dated Jul. 21, 2017.

International Patent Application No. PCT/US2016/043384—International Search Report and Written Opinion dated Oct. 12, 2016.

Chinese Patent Application No. 201610011395.4—Second Office Action dated Feb. 14, 2018.

Guo Jialin etc., "Analysis on affecting factors of thermal cracking behavior of anodic oxide film on 6060 aluminum alloy", Materials Research and Application, vol. 5, No. 3, Sep. 2011, p. 229-232.

(56) References Cited

OTHER PUBLICATIONS

Habazaki, H. et al. Effects of Alloying Elements in Anodizing of Aluminium. Trans IMF, 1997, 75(1), 18-23. (Year: 1997), 6 pages.
The Aluminum Association, Inc. International Alloy Designations and Chemical Composition Limits for Wrought Aluminum and Wrought Aluminum Alloys. Jan. 2015. (Year: 2015), 38 pages.

* cited by examiner

ANODIC OXIDE BASED COMPOSITE COATINGS OF AUGMENTED THERMAL EXPANSIVITY TO ELIMINATE THERMALLY INDUCED CRAZING

CROSS-REFERENCE TO RELATED APPLICATIONS

This application claims the benefit of priority under 35 U.S.C § 119(e) to U.S. Provisional Application No. 62/232,239, entitled "ANODIC OXIDE BASED COMPOSITE COATINGS OF AUGMENTED THERMAL EXPANSIVITY TO ELIMINATE THERMALLY INDUCED CRAZING," filed on Sep. 24, 2015, which is incorporated by reference herein in its entirety. This application is related to U.S. application Ser. No. 14/593,845, entitled "PROCESSES TO REDUCE INTERFACIAL ENRICHMENT OF ALLOYING ELEMENTS UNDER ANODIC OXIDE FILMS AND IMPROVE ANODIZED APPEARANCE OF HEAT TREATABLE ALLOYS," filed on Jan. 9, 2015; and U.S. application Ser. No. 14/795,832, entitled "PROCESS FOR REDUCING NICKEL LEACH RATES FOR NICKEL ACETATE SEALED ANODIC OXIDE COATINGS," filed on Jul. 9, 2015, each of which is incorporated herein in its entirety.

Any publications, patents, and patent applications referred to in the instant specification are herein incorporated by reference in their entireties. To the extent that the publications, patents, or patent applications incorporated by reference contradict the disclosure contained in the instant specification, the instant specification is intended to supersede and/or take precedence over any such contradictory material.

FIELD

The described embodiments relate generally to anodic films and anodizing processes. More particularly, the present embodiments relate to processing anodic films such that they are resistant to thermally induced cracking.

BACKGROUND

Anodizing is a method of providing an anodic oxide coating on a metal substrate, often used in industry to provide a protective and sometimes cosmetically appealing coating to metal parts. During an anodizing process, a portion of the metal substrate is converted to a metal oxide, thereby forming a protective oxide layer or coating. The nature of the anodic oxide coatings can depend on a number of factors, including chemical makeup of the metal substrates and the process parameters used in the anodizing processes. Sulfuric acid based anodizing processes, such as "Type II" and "Type III" anodizing as defined by military MIL-A-8625 specifications, are widely used to provide porous anodic oxide coatings which are then sealed to give good wear and corrosion resistance on the aluminum substrates.

Although sealed anodic oxide coatings can provide good wear and corrosion resistance, they can be susceptible to cracking when exposed to high temperatures. This is due to the difference in thermal expansion coefficients between the oxide material and underlying metal substrate. In particular, the metal substrate generally has a much higher thermal expansion coefficient than an overlying anodic oxide. When an anodized part is exposed to higher temperatures, the metal substrate expands more than the overlying anodic oxide, creating tensile stress within the anodic oxide coating that can cause the anodic oxide coating to develop small cracks once cooled back down to room temperature. These small cracks may not only be cosmetically unappealing, but may also impair the corrosion protection of the anodic oxide coating. In some cases, temperatures as low as 80 to 100 degrees Celsius can cause crazing of an anodic oxide coating. What are needed therefore are anodic oxide coatings that are more resistant to thermally induced cracking.

SUMMARY

This paper describes various embodiments that relate to anodic oxide coatings and processes for increasing resistance of anodic oxide coatings to thermally induced crazing. The processes involve incorporating a material having a high thermal expansion coefficient within pores such that the anodic oxide coatings can expand to an extent more similar to that of an underlying metal substrate when exposed to heat.

According to some embodiments, a method of forming an anodic oxide coating resistant to thermally induced cracking is described. The method includes anodizing a substrate such that the resultant anodic oxide coating comprises pores within a metal oxide. The method also includes incorporating a material within at least some of the pores. The material has a higher thermal expansion coefficient than that of the metal oxide. The method can also include sealing the anodic oxide coating. The incorporated material increases an in-plane thermal expansivity of the sealed anodic oxide coating such that the sealed anodic oxide coating resists cracking when the anodized substrate is exposed to a target temperature.

According to additional embodiments, an anodized part is described. The anodized part includes an aluminum alloy substrate. The anodized part also includes a sealed anodic oxide coating on the aluminum alloy substrate. The sealed anodic oxide coating has internal pores. At least some of the pores have material incorporated therein that renders the sealed anodic oxide coating resistant to cracking when the anodized part is exposed to a target temperature.

According to further embodiments, a method of treating an anodized part is described. The anodized part includes a porous anodic oxide coating on an aluminum alloy substrate. The method includes incorporating a material within at least some of the pores. The method also includes sealing the porous anodic oxide coating such that openings of the pores are sealed. The incorporated material renders the sealed anodic oxide coating resistant to cracking when the anodized part is exposed to a target temperature.

These and other embodiments will be described in detail below.

BRIEF DESCRIPTION OF THE DRAWINGS

The disclosure will be readily understood by the following detailed description in conjunction with the accompanying drawings, wherein like reference numerals designate like structural elements.

FIG. 8 shows a flowchart indicating a process for forming an anodic coating that resistant to thermally induced cracking.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

A process is disclosed for minimizing the difference in thermal expansivity between a porous anodic oxide coating and its corresponding substrate metal, so as to allow heat treatments or high temperature exposure of the anodic oxide without thermally induced crazing. A material characterized as having a higher thermal expansion coefficient than that of the anodic oxide material is incorporated into the pores of the anodic oxide in sufficient quantity to raise the coating's thermal expansivity to a level where the difference in thermal expansion between the coating and substrate in a given thermal exposure is insufficient for any significant cracking to result. The deposition of the high thermal expansion coefficient material thus enables higher temperature exposures to be conducted after anodizing and sealing of an anodic oxide, yielding a product with a wider range of permissible temperature exposure during manufacturing and in-service.

The high thermal expansion coefficient material can be, for example, an electrodeposited metal, or an electrophoretically deposited polymer. Suitable metal materials can include, but are not limited to, one or more of tin, copper, zinc, silver, nickel, cobalt and iron. Suitable polymer materials can include, but are not limited to, one or more of epoxy and acrylic. The material can be uniformly deposited to a certain depth within the pores, or may be deposited with a through-thickness variation in concentration, with a resulting variation in the thermal expansivity through the thickness of the resulting composite coating structure.

As used herein, the terms anodic oxide, anodic oxide coating, anodic film, anodic layer, anodic coating, oxide film, oxide layer, oxide coating, metal oxide, etc. can be used interchangeably and can refer to suitable metal oxide materials, unless otherwise specified.

Methods described herein are well suited for providing cosmetically appealing surface finishes to consumer products. For example, the methods described herein can be used to form durable and cosmetically appealing anodized finishes for housing for computers, portable electronic devices, wearable electronic devices, and electronic device accessories, such as those manufactured by Apple Inc., based in Cupertino, Calif.

These and other embodiments are discussed below with reference to FIGS. 1-8. However, those skilled in the art will readily appreciate that the detailed description given herein with respect to these Figures is for explanatory purposes only and should not be construed as limiting.

Figure 1:
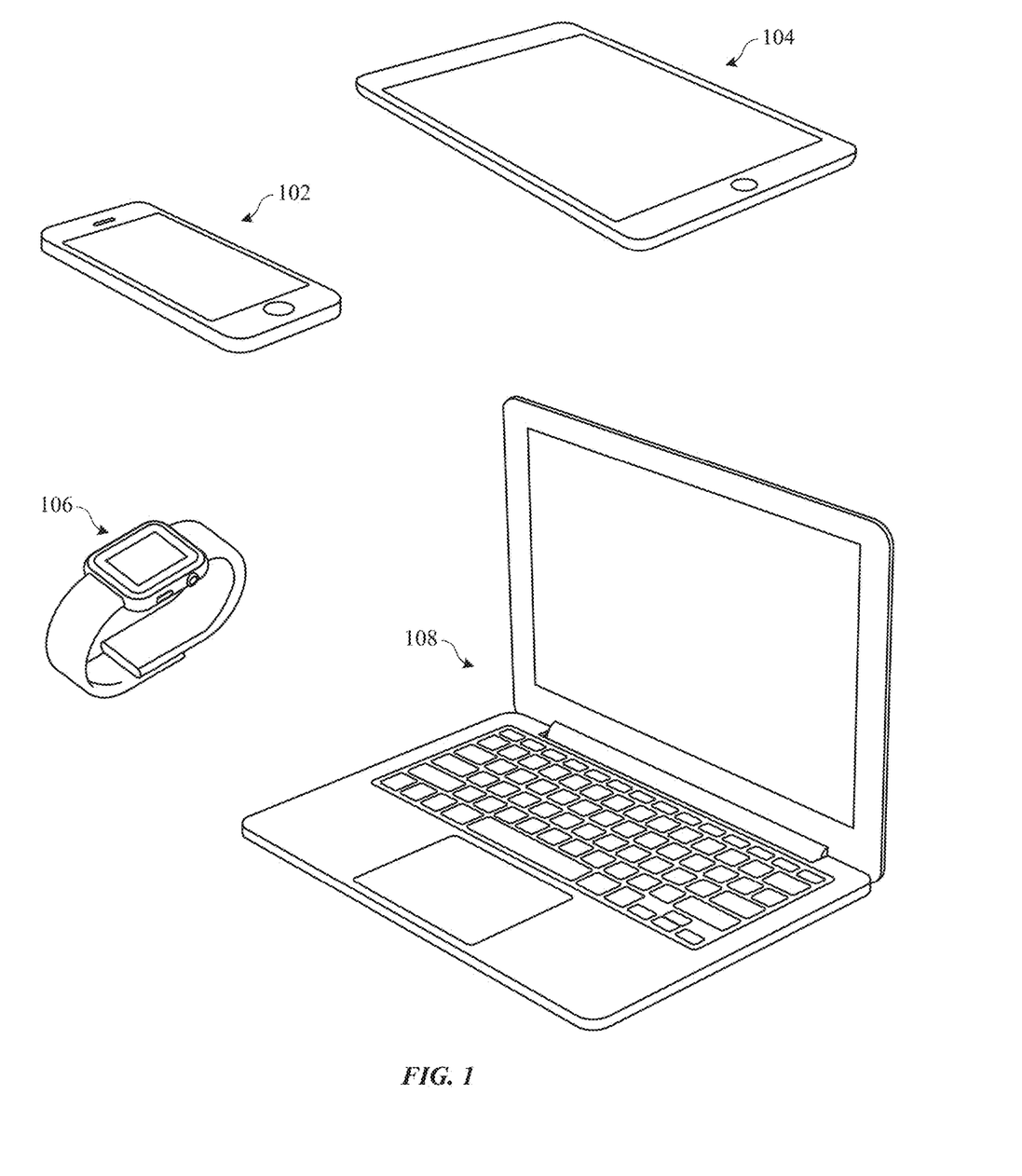
FIG. 1 shows perspective views of devices having metallic surfaces that can be protected using anodic oxide coatings described herein.

The methods described herein can be used to form durable and cosmetically appealing coatings for metallic surfaces of consumer devices. FIG. 1 shows consumer products that can be manufactured using methods described herein. FIG. 1 includes portable phone 102, tablet computer 104, smart watch 106 and portable computer 108, which can each include housings that are made of metal or have metal sections. Aluminum alloys are often a choice metal material due to their light weight and ability to anodize and form a protective anodic oxide coating that protects the metal surfaces from scratches. The anodic oxide coatings can be dyed to colorize the metal housing or metal sections, adding numerous cosmetic options for product lines.

During manufacturing, the anodized metal portions of devices 102, 104, 106 and 108 can be subject to a number of high temperature treatments, such as artificial aging of an aluminum alloy substrate and thermal cure cycles for adhesives and other polymeric components. As described in detail below, these higher temperatures can cause small but visible cracks to form within the anodic oxide coatings. Described herein are processes for increasing the resistance of the anodic oxide coatings on devices such as devices 102, 104, 106 and 108 to thermally induced cracking.

Figure 2A:
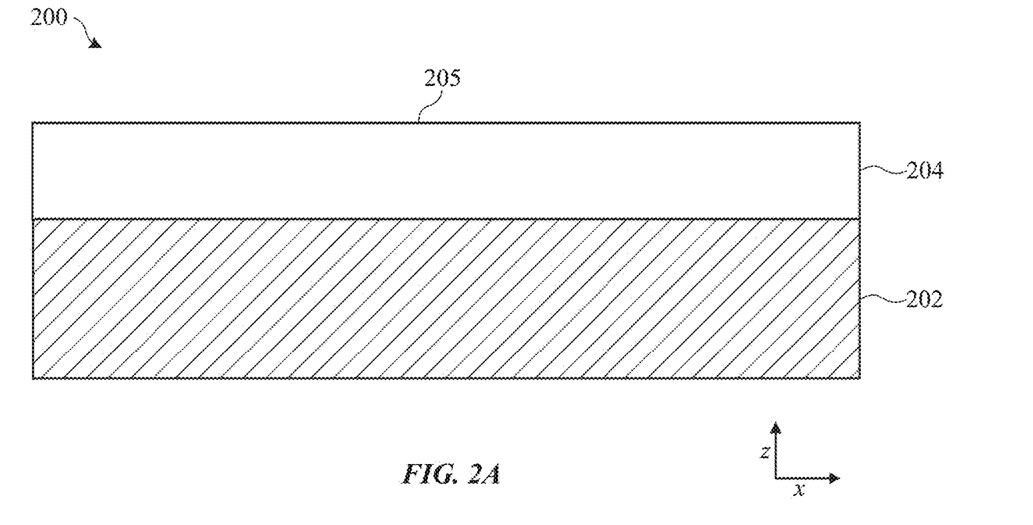
FIGS. 2A and 2B show an untreated anodized part prior to and after exposure to a thermal process.
Figure 2B:
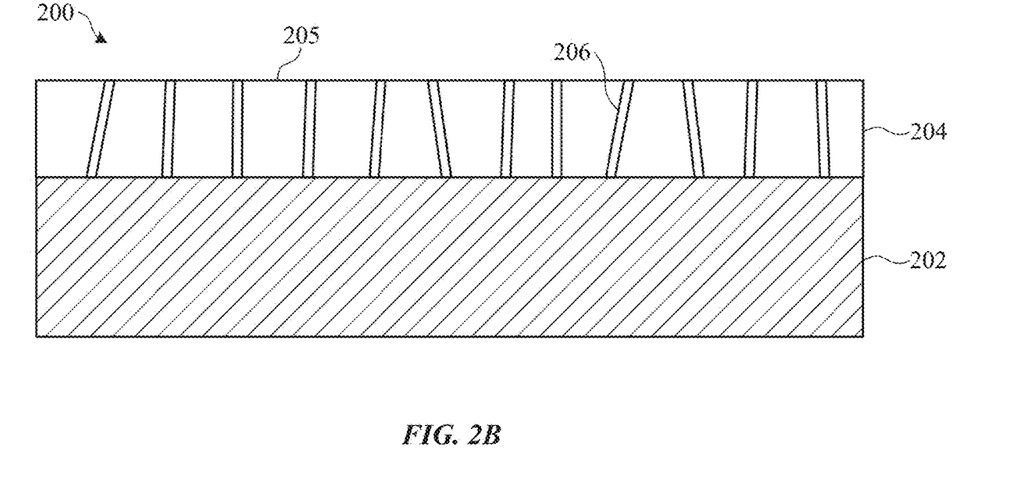

FIGS. 2A and 2B illustrate schematic cross-section views of a surface portion of anodized part 200 before and after a thermal process, respectively. Anodized part 200 includes metal substrate 202 that is coated with anodic oxide coating 204. Metal substrate 202 is made of an anodizable material, such as aluminum or aluminum alloy, which can be converted to a corresponding metal oxide material, i.e., anodic oxide coating 204, using an anodizing process. Type II and Type III anodizing processes, as defined by military MIL-A-8625 specifications, are widely used to provide anodic oxide coatings with good wear and corrosion resistance on the aluminum and aluminum alloy substrates. The anodizing results in a porous anodic oxide coating 204 that has numerous pores formed therein, which correspond to elongated voids having average diameters on the scale of tens of nanometers and that are formed during the anodizing process.

FIG. 2A shows anodized part 200 prior to thermal process. As shown, anodic oxide coating 204 does not include visible cracks, and can therefore be referred to as craze-free. In addition, exterior surface 205 of anodic oxide coating 204 is continuous and unbroken—i.e., does not have cracks. FIG. 2B shows anodized part 200 after a thermal process whereby anodized part 200 is heated to temperatures about 80 degrees Celsius or higher. As shown, cracks 206 form within anodic oxide coating 204 after exposure to the thermal process, which can be visible to an unaided human eye and which breaks the otherwise continuous exterior surface 205 of anodic oxide coating 204.

Cracks 206 are due to differences in material of metal substrate 202 and anodic oxide coating 204. In particular, metal substrate 202 is a metal material whereas anodic oxide coating 204 is a metal oxide material. These two types of materials have different thermal expansion coefficients (c), which are measures of how much the materials expand when heated, and are generally measured as a fractional change in size per degree change in temperature at a constant pressure. In general, metal materials expand more when heated compared to metal oxide materials—and therefore metal materials generally have higher thermal expansion coefficients than those of metal oxide materials.

For example, aluminum alloys have a thermal expansion coefficient of about 22-23 micro-strain per Kelvin, whereas corresponding aluminum oxides have the much lower thermal expansion coefficient of a ceramic, typically about 5-6 micro-strain per Kelvin for anodic alumina—almost 4 times smaller than that of an aluminum alloy. For layered materials, it can be useful to define thermal expansion in terms of in-plane thermal expansivity, which can be defined as the change in area (or length) per change in temperature. Thus, due to the differences in thermal expansion coefficients of metal versus metal oxides, metal substrate 202 will have a higher in-plane thermal expansivity than that of anodic oxide coating 204.

Since anodic oxide coating 204 will expand less than metal substrate 202 when anodized part 200 is heated, strain (ε) will develop within anodic oxide coating 204. This difference results in a tensile stress ($\sigma_d$) to form within anodic oxide coating 204. At elevated temperatures, anodic oxide coating 204 experiences tensile stress ($\sigma_d$) in accordance with the following equations:

$$\sigma_d = \frac{E_d}{(1-v_d)}\Delta\varepsilon \quad (1)$$

where $E_d$ is the Young's Modulus of the coating, $v_d$ is the Poisson ratio for the coating, Δε is the difference in the strains between the substrate and coating, and where:

$$\Delta\varepsilon = \Delta\alpha\Delta T \quad (2)$$

where Δα is the difference between the thermal expansion coefficients of the coating and substrate, and ΔT is the temperature change over which the stress and strain are being considered.

When anodized part 200 is cooled back down to room temperature, metal substrate 202 will contract more than anodic oxide coating 204, resulting in formation of cracks 206 within anodic oxide coating 204. In this way, anodic oxide coating 204 can be brittle under tension and is therefore susceptible to fracture and crazing. Note that anodic oxide coating 204 is much more susceptible to cracking and crazing after anodic oxide coating 204 is sealed using a sealing process whereby anodic oxide coating 204 is hydrated to seal open pores, and which is standard procedure in most applications. Typically, an anodized aluminum part with an anodic coating having a thickness of about 10 micrometers or more, and sealed by hot water or hot nickel acetate solution, exhibits widespread cracking of the anodic oxide layer when exposed to temperatures of more than a certain critical temperature, which is usually in the range of about 80-100 degrees Celsius.

Figure 3:
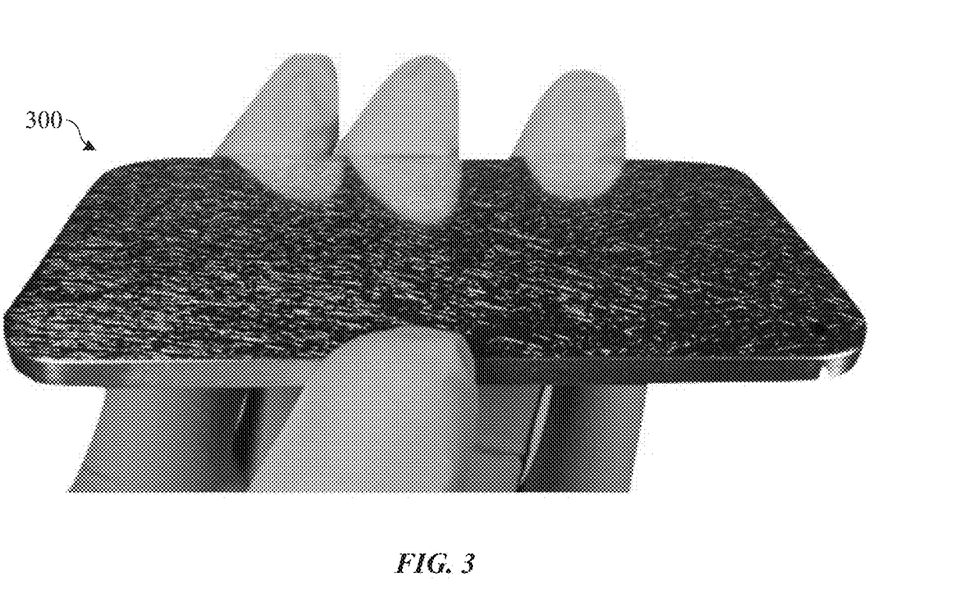
FIG. 3 shows an image of an untreated anodized part with a cracked anodic oxide coating from exposure to a thermal process.

This is demonstrated in FIG. 3, which shows an image of anodized part 300, with an anodic oxide coating that has been formed on a mirror-like, lapped aluminum surface, and is held at such an angle as to reflect a dark background. The visibly light colored lines within anodized part 300 correspond to thermally induced fine cracks, sharply scattering light within the otherwise optically clear anodic oxide coating. Note that the cracks are more apparent on mirror polished substrates compared to textured substrates (e.g., blasted or etched), although they are present to some degree on all surface finishes.

This cracking is cosmetically unacceptable on consumer products, but also diminishes the corrosion protection of the anodic oxide layer. This also limits allowable service conditions for the anodic oxide coating, and further limits post-anodizing processing options to exclude any operations that might expose the anodized part to temperatures of 80 degrees Celsius or more. Examples of operations that may not be conducted on conventional sealed anodic oxide coatings without compromising the cosmetics of the surface finish can include tempering for metallurgical purposes, such as post-anodizing aging for precipitation strengthening, and heat treatments for diffusing away interfacially enriched elements, such as diffusing away interfacially enriched zinc in 7000-series aluminum alloys. These thermal treatments are described in U.S. application Ser. No. 14/593,845, which is incorporated by reference herein in its entirety. Other post-anodizing heating processes can include laser marking processes where localized areas of the anodized part are heated, baking out hydrogen from the anodized part, and/or shrink wrapping processes where the anodized parts can be heated during shrink wrapping with a polymer material. Also, parts may be exposed to thermal cycles for curing adhesives, lacquers, or certain sealing compounds.

The stress to which an anodic oxide coating is exposed depends not only on the exposure temperature and the difference in thermal expansion coefficients (as described by equations (1) and (2) above), but also on the coating's elasticity, and on any pre-existing stress state. The elasticity and pre-existing stress state may be varied to a limited extent by changing the anodizing process parameters and the sealing process, but such changes cannot eliminate crazing altogether. Anodic oxide coating thickness is also found to have a strong influence on the susceptibility to cracking, which may be explained by the higher strain energy release rate for fracture of thicker anodic oxide coatings. Thickness is the most readily changed parameter, and in conventional practice anodic oxide coatings that are exposed to high temperatures are often restricted in thickness (typically to less than about 10 micrometers) to avoid cracking.

In the present paper, processes for making cosmetic anodic oxide coatings insensitive to thermally induced strains, even when grown to thicknesses of 10 micrometer or more, are described. That is, the treatments render the anodic oxide coatings substantially craze-free after the thermal process is performed. An anodic oxide coating can be referred to as substantially craze-free if there are no visible cracks therein. An anodic oxide coating can also be referred to as craze-free if exterior surface 205 is continuous and unbroken—i.e., does not have cracks, similar to shown in FIG. 2A. This is achieved by depositing a second phase of higher thermal expansion coefficient, such as a metal or a polymer, within the pores of the anodic oxide coating so as to yield a modified anodic oxide layer of material of intermediate thermal expansivity. In effect, a composite layer of metal and metal oxide, or of polymer and metal oxide, is formed on the metal substrate.

With reference to equations (1) and (2) above, Δα is reduced, such that for a given temperature change ΔT, the corresponding differential strain Δε is also reduced. Thus, the stress to which the coating is exposed ($\sigma_d$) may be brought below the critical stress for fracture of the coating, and cracking may be avoided.

Figure 4:
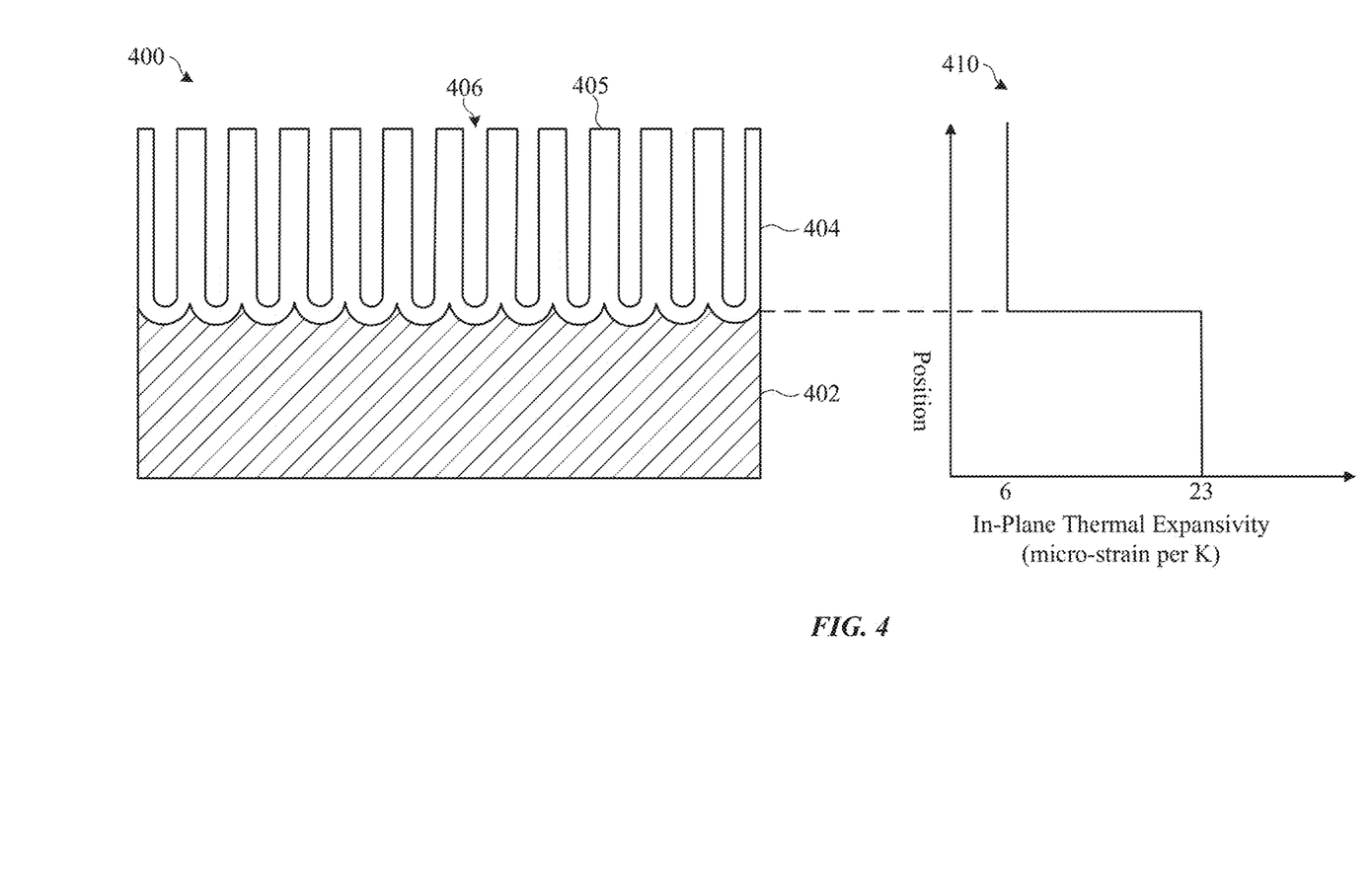
FIG. 4 shows a schematic cross-section view of an anodized part and associated graph of in-plane thermal expansion coefficient as a function of position through the thickness of the coating, prior to treatment with a high thermal expansion coefficient material.

FIG. 4 shows a schematic cross-section view of anodized part 400 and associated graph 410 prior to deposition of a high thermal expansion coefficient material. Anodized part 400 includes metal substrate 402 and anodic oxide coating 404. Anodic oxide coating 404 is porous and includes pores 406 within metal oxide material 405. For a typical anodic oxide coating 404 on aluminum (e.g., those formed by a typical "Type II" anodizing process, as per MIL A-8625), pores 406 generally have columnar, cylindrical shapes with circular cross-sections and an average diameter of about 10-30 nanometers—with pores 406 taking about 10-30 volume percent of anodic oxide coating 404.

This porosity enables controlled coloring of anodic oxide coating 404—for example by organic dye adsorption, pigmenting, or electrodeposition of metals to yield silver, grey, bronze and black shades. However, pores 406 must be sealed prior to use in any consumer-facing cosmetic application, because unsealed pores 406 make anodic oxide coating 404 susceptible to staining, discoloration, uptake of dirt and contamination, and leaching of any colorants. Typical sealing operating include hot water sealing, which hydrates the oxide on the surface of pore walls, expanding the walls to close and plug pores 406.

Prior to sealing, anodic oxide coating 404 is mechanically compliant (i.e., has a low elastic modulus) and can be sufficiently tolerant of thermally induced strains to permit heat treatments, such as described in U.S. application Ser. No. 14/593,845—although the restriction of applying such heat treatments to unsealed parts may be undesirable in high volume production. After sealing, however, anodic oxide coating 404 is relatively stiff and a given strain induces far greater stresses. This stiffness makes anodic oxide coating 404 susceptible to cracking at temperatures over about 80-100 degrees Celsius (See reference Wernick, Sheasby and Pinner, "The Surface Treatment and Finishing of Aluminium and Its Alloys", 5th edition, p 973). This eliminates any possible post-sealing heat treatments, with the notable exception of heat treatments in aqueous solutions described in U.S. application Ser. No. 14/795,832, which is incorporated by reference herein in its entirety.

Graph 410 shows the in-plane thermal expansivity when transitioning between anodic oxide coating 404 to metal substrate 402 after anodic oxide coating 404 is sealed. As indicated by graph 410, the in-plane thermal expansivity transitions abruptly from about 6 micro-strain per Kelvin at anodic oxide coating 404 to about 23 anodic metal substrate 402. This makes anodic oxide coating 404 susceptible to thermal induced cracking, as described above.

Figure 5:
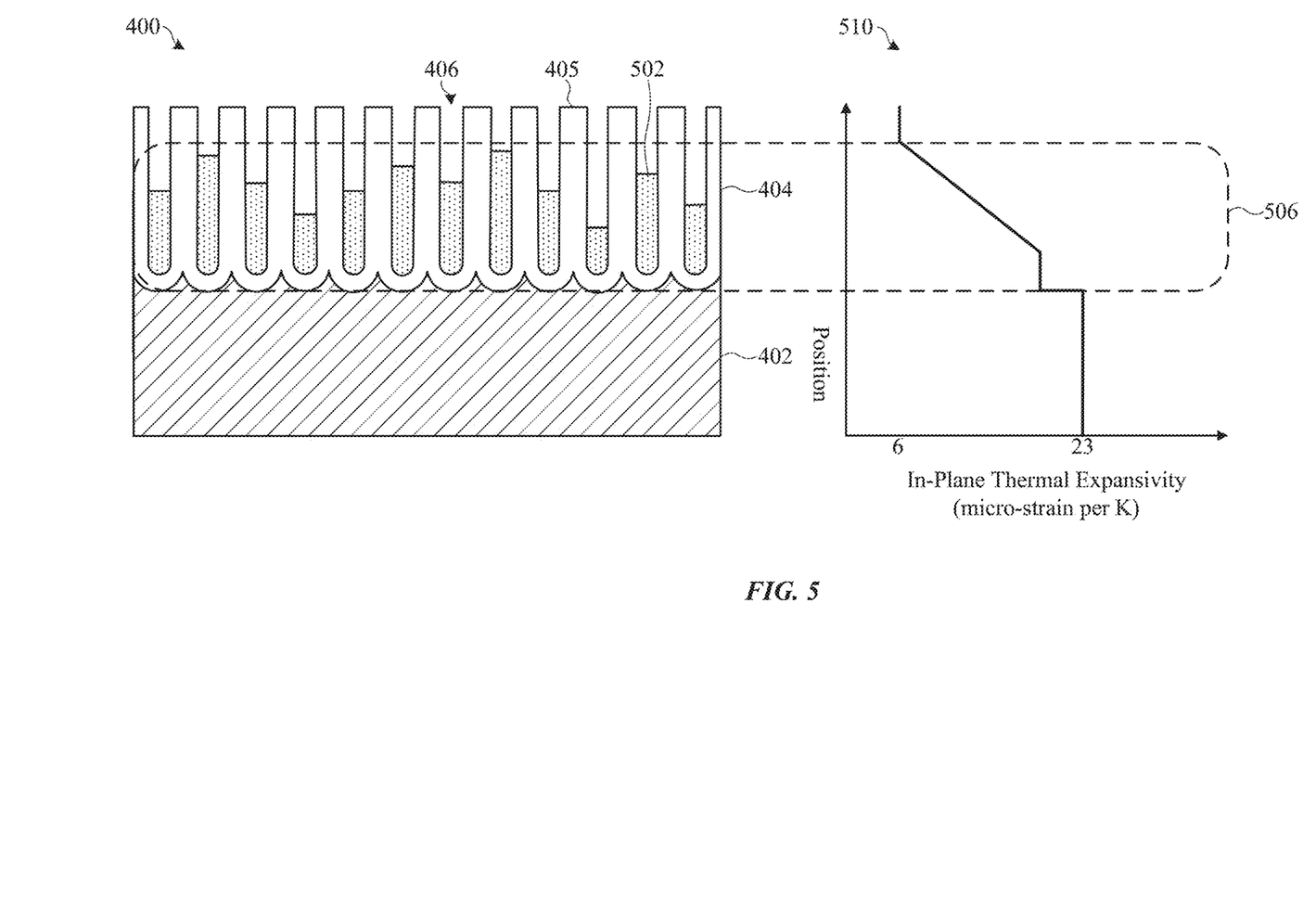
FIG. 5 shows a schematic cross-section view of the anodized part of FIG. 4, and associated graph of in-plane thermal expansion coefficient as a function of position through the thickness of the coating, after treatment with a high thermal expansion coefficient material.

FIG. 5 shows a schematic cross-section view of anodized part 400 after deposition of material 502 having a high thermal expansion coefficient. In particular, pores 406 are filled with material 502 having a higher thermal expansion coefficient than the metal oxide material of anodic oxide coating 404 such that anodic oxide coating 404 takes on a total thermal expansivity that more closely matches that of metal substrate 402. This creates a region of augmented thermal expansivity 506 within anodic oxide coating 404. In this way, material 502 can be referred to as a second phase of anodic oxide coating 404, with the first phase being the metal oxide material.

Graph 510 shows the in-plane thermal expansivity as a function of position through the out-of-plane thickness of oxide coating 404 and metal substrate 402 system. As indicated by graph 510, the transition of in-plane thermal expansivity gradually transitions from about 6 micro-strain per Kelvin at anodic oxide coating 404 to about 23 anodic metal substrate 402. This graded thermal expansivity can be due to pores 406 being filled to varying heights with material 502. Once sealed, anodic oxide coating 404 will retain the higher thermal expansivity imparted by material 502, and will therefore experience a correspondingly reduced thermal strain and stress upon heating, which can enable anodized part 400 to be exposed to temperatures of well over 100 degrees Celsius, even 200 degrees Celsius or more, without any appreciable crazing—even when anodic oxide coating 404 is grown to a high thickness of 10 micrometers or more. Thus, anodized part 400 will be substantially craze-free after exposure to a target temperature, which can correspond to a maximum temperature that anodized part 400 is expected to be exposed to.

The extent of region of augmented thermal expansivity 506 within anodic oxide coating 404 may be controlled, and the stress state induced by a given temperature exposure can be correspondingly controlled. This enables anodic oxide coating 404 to be grown to greater thicknesses, and hence provide greater protection against abrasive wear, than would otherwise be possible. In an example simplified for illustrative purposes, if the innermost 10 micrometers of anodic oxide coating 404 having a thickness of 15 micrometers were filled with material 502 so as to eliminate thermally induced strain in these inner 10 micrometers, then the 15 micrometers anodic oxide coating 404 is rendered as resistant to thermally induced crazing as a much thinner 5 micrometers anodic oxide coating. This 15 micrometers anodic oxide coating 404 could thus be used in applications where a certain anticipated thermal exposure would otherwise have limited thickness to 5 micrometers.

The type of material 502 can vary depending on a number of factors, such as a maximum or target temperature in which anodized part 400 is expected to endure, as well as a desired final color of anodic oxide coating 404. In some embodiments, material 502 is a metal material that can be electrodeposited within pores 406 from a solution. Suitable metal materials can include one or more of tin, copper, zinc, silver, nickel, cobalt and iron. For example, tin may be deposited from a solution of 15 g/L of tin (II) sulfate, controlled to a pH of 1.5 by addition of sulfuric acid, with an applied alternating current ramped over two minutes to 15 V by alternating current. Similarly, copper may be deposited from a solution of 35 g/L of $CuSO_4$+20 g/L of $MgSO_4$, applied at 15 V by alternating current for a time ranging from seconds to about 10 minutes. The metals depositions have thermal expansion coefficients significantly higher than that of aluminum oxide, and relatively close to that of an aluminum alloy substrate: about 23, 17 and 30 micro-strain per Kelvin for tin, copper and zinc, respectively. In some embodiments, two or more types of metals are co-deposited within pores 406 to achieve a particular target thermal expansivity for anodic oxide coating 404, and/or a particular target color for anodic oxide coating 404.

During electrodeposition, the metal material is deposited at the terminal ends of pores 406 proximate to the metal substrate 402, and progressively fills pores 406 outwards to a thickness controlled by the electrodeposition process time and the applied voltage or current density. Ideally, the metal material fills a significant fraction of the thickness of anodic oxide coating 404, but even a thin layer of about 2-3 micrometers is sufficient to mitigate thermally induced cracking for an anodic oxide coating 404 having a thickness of about 10 micrometers. Electrodeposition of metals typically yields a wide range of pore-to-pore variation in deposit thickness. This can be beneficial in optical terms as it can help scatter and diffuse light to yield a deep black, but it may also be useful in providing a through-thickness variation of the in-plane thermal expansion coefficient, corresponding to through thickness variation in the fraction of filled pores 406, as described above.

In some embodiments, material 502 is a polymer material. Polymers can exhibit a wider range of thermal expansion coefficients than metals, with some polymers having values as high as 100-200 micro-strain per Kelvin. Therefore, polymers may have a still greater benefit in terms of eliminating differential thermal expansion than some metal materials. In addition, some polymers may not significantly darken the color of anodic oxide coating 404, enabling lighter color shades to be achieved by additional dyeing or pigmentation.

Polymers are, in some cases, themselves more constrained in exposure temperature, and may soften at elevated temperatures. Thus, candidates for polymer materials may be chosen for their resistance to significant softening at target temperatures. Some polymer candidates include epoxy and acrylic, the latter also known as poly(methyl methacrylate) (PMMA), both of which can be readily applied by electrophoretic deposition from water-based suspensions. These have thermal expansion coefficients of about 75 and about 45-65, respectively. PMMA is a thermoplastic with a melting point of only about 160 degrees Celsius, but its glass transition temperature can be almost as high as this, making it still a useful candidate for some applications. In some embodiments, epoxy is preferred since it is a thermosetting polymer, which enables its use at higher temperatures than acrylic. In some embodiments, two or more types of polymer material are deposited within pores 406 to achieve a particular target thermal expansivity for anodic oxide coating 404, and/or a particular target color for anodic oxide coating 404.

The afore-mentioned approaches to incorporate material 502 within pores 406 both start deposition at the terminal ends of pores 406, and the deposit progressively fills pores 406 from the terminal ends upward. This ensures the highest thermal expansivity for anodic oxide coating 404 closest to metal substrate 402, minimizing the thermal expansion coefficient step change from metal substrate 402 to anodic oxide coating 404. A progressive reduction in the volume fraction of pores 406 filled with material 502 can be used to engineer a gradient of thermal expansivity. This approach also leaves the outermost region of the pores 406 unaffected, allowing conventional dyeing and sealing approaches to follow.

However, alternative approaches to applying material 502 exist—such as immersion or spraying. These approaches typically result in higher concentrations of material 502 near the outer surface of anodic oxide coating 404 opposite metal substrate 402, and may not be compatible with subsequent coloring by organic dyeing, or with conventional sealing process by hydration. Nevertheless, they expand the range of applicable materials beyond the electrodeposited metals and electrophoretically deposited polymers, and may be preferable in certain instances. In such cases, the material 502 may itself serve as the colorant and/or sealant, or alternative approaches to coloring and sealing may be used. In some cases, a first portion of material 502 is deposited within the terminal ends of pores 406 using electrodeposition or electrophoretic deposition while a second portion of material 502 is deposited within outer portions of pores 406—in which case the same or different types of material 502 can be used. For example, a first type of material (e.g., metal(s) or polymer(s)) can be deposited within the terminal ends of pores 406 and a second type of material (e.g., metal(s) or polymer(s)) can be deposited at outer regions of pores 406.

Figure 6A:
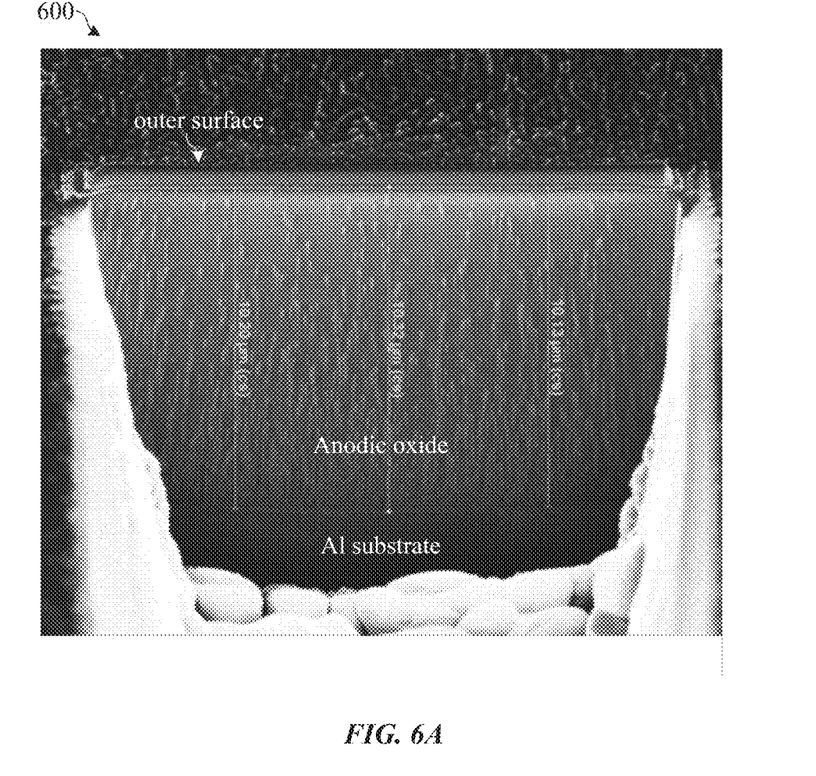
FIG. 6A shows a focused ion beam (FIB) image of a cross section of an anodized aluminum alloy substrate after treatment with a high thermal expansion coefficient material.

FIG. 6A shows a focused ion beam (FIB) image 600 of a cross section of an anodized aluminum alloy substrate with a second phase metal material deposited therein. In particular, light colored vertical lines within the anodic oxide layer correspond to tin electrodeposited within the pores of the anodic oxide layer. Image 600 shows that the tin is distributed more densely at terminal ends of the pores near the substrate compared to opposite ends near the outer surface of the anodic oxide layer. This gradient of tin concentration provides a gradient of thermal expansivity within the anodic oxide layer. Note that the anodic oxide layer is grown to about 10 micrometers in thickness.

Figure 6B:
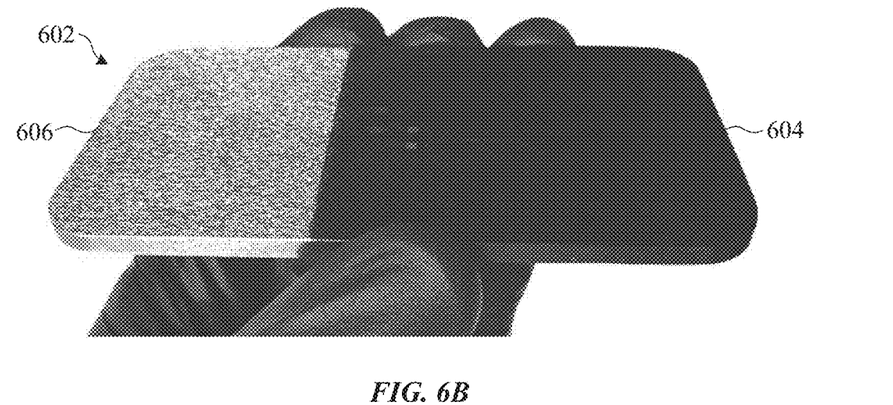
FIG. 6B shows an image of an anodized part after treatment with a high thermal expansion coefficient material and being exposed to a high temperature process.

FIG. 6B shows an image of anodized part 602 after being exposed to a temperature of 175 degrees Celsius. First portion 604 has been treated with a high thermal expansion coefficient material, specifically tin, and second portion 606 has not been treated with a high thermal expansion coefficient material. The anodic oxide coating of second portion 606 includes numerous light colored cracks as a result of thermally induced crazing. However, the anodic oxide coating of first portion 604 is craze-free in that it does not have visibly apparent cracks. The tin within the anodic oxide coating of first portion 604 increases the thermal expansivity of the anodic oxide coating closer to that of the underlying metal substrate, thereby allowing anodized part 602 to be heated to a target temperature (e.g., 175 degrees Celsius or more) without experiencing cracking or crazing.

Figure 7A:
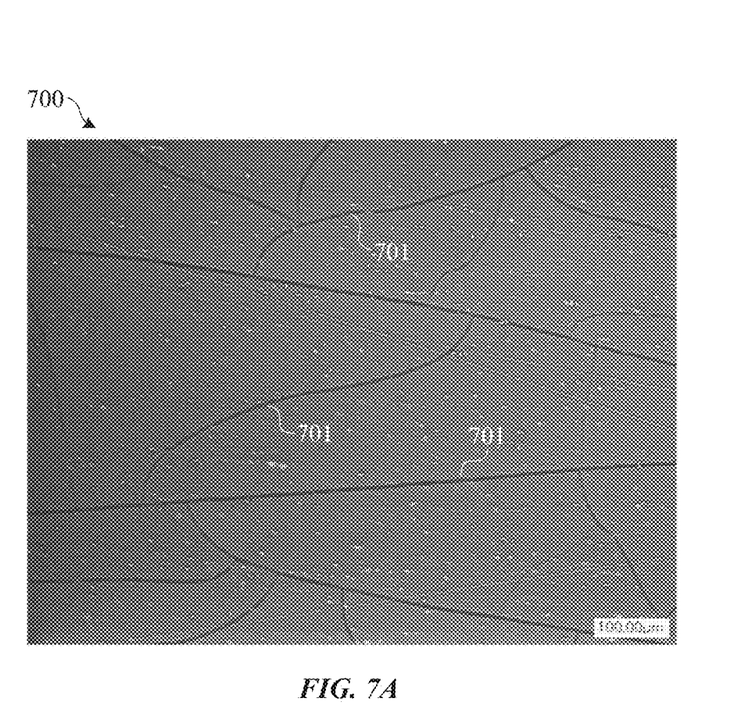
FIGS. 7A and 7B show top-down images of an untreated anodized substrate and a treated substrate after exposure to a high temperature process.
Figure 7B:
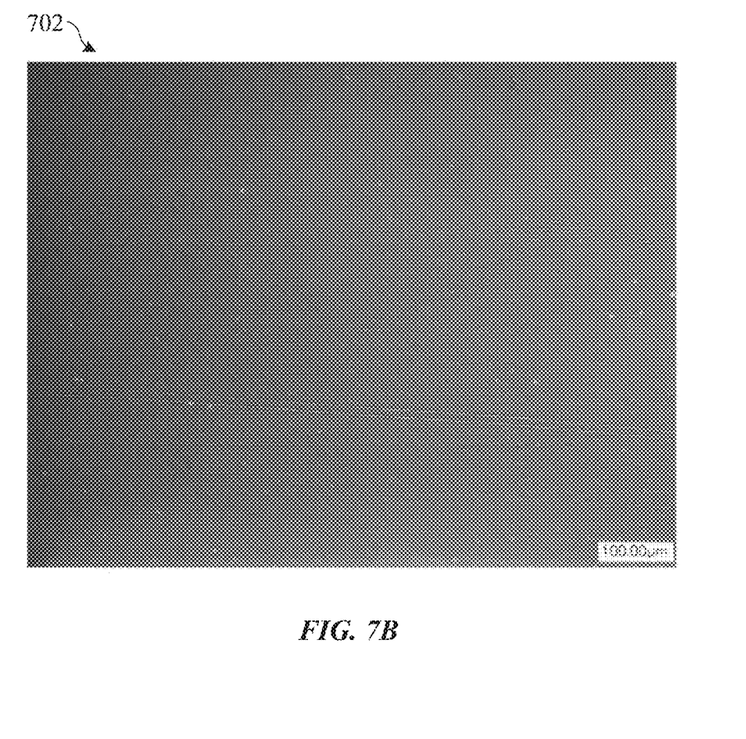

FIGS. 7A and 7B show top-down images 700 and 702 of two anodized aluminum alloys substrates after exposure to heat treatments of 175 degree Celsius for one hour each. The anodized substrate of image 700 has been dyed with a black dye but not infused with a high thermal expansion coefficient material. The anodized substrate of image 702 has been infused with a high thermal expansion coefficient material, specifically tin. As shown, the anodic oxide of image 700 has numerous cracks 701. In contrast, the anodic oxide of image 702 is free of cracks.

FIG. 8 shows flowchart 800 indicating a process for forming an anodic coating resistant to thermally induced cracking. At 802, the anodic coating is formed on a metal substrate, such as an aluminum alloy substrate. An anodizing process can be used to form a porous anodic coating having pores within a metal oxide material. In some embodiments, a Type II or Type III anodizing process is used to form an anodic coating having good wear and corrosion resistance.

At 804, a material characterized as having a high thermal expansion coefficient is incorporated within pores of the anodic coating. The material should have a higher thermal expansion coefficient than that of the metal oxide material. In some embodiments, the material has a thermal expansion coefficient equal to or more than that of the metal substrate. The material increases a thermal expansivity of the anodic coating closer to that of the metal substrate. In some embodiments, a distribution of the material within the pores is varied so as to create a gradient of thermal expansivity within the anodic coating. In some embodiments, more than one type of high thermal coefficient materials is deposited within the pores. For example, two or more metals and/or two or more polymer materials can be deposited within the pores in order to achieve a predetermined thermal expansivity and/or color of the anodic coating.

At 806, the anodic coating is optionally dyed using, for example, an organic dye. The dye can be deposited within upper regions of the pores not occupied by the high thermal expansion coefficient material. In some cases, the dye can enhance the color of the high thermal expansion coefficient material. For example, a black dye can further darken a dark colored high thermal expansion coefficient material to give the anodic coating a deep and rich black color. Alternatively, the dye can cooperate with the high thermal expansion coefficient material to provide a unique color to the anodic coating. For example, a blue dye can combine with a dark colored high thermal expansion coefficient material to provide a dark color with blue hue to the anodic coating. Similar combinations can be achieved with red, yellow, pink, green, etc. dyes.

At 808, the anodic coating is sealed using a sealing process that hydrates the metal oxide material and thereby closes and seals the pores. In this way, the high thermal expansion coefficient material becomes sealed within the anodic coating and the anodic coating is more resistant to corrosion. In some embodiments, the sealing process involves immersing the anodized part in hot water or hot nickel acetate solution. The high thermal expansion coefficient material increases the thermal expansivity of the anodic coating compared to an anodic coating without the high thermal expansion coefficient material incorporated therein. This brings the thermal expansivity of the anodic coating closer to the thermal expansivity of the metal substrate, thereby rendering the anodic coating more resistant to cracking when exposed to heat. That is, when the anodized substrate is heated, the anodic coating will expand more than if the high thermal expansion coefficient material were not incorporated such that the anodic coating will expand to an extent that more closely matches the extent to which the metal substrate expands.

At 810, the anodized substrate is optionally exposed to a thermal treatment. The thermal treatment can be a manufacturing operation that is performed during the manufacture of final product. For example, the substrate may be made of an alloy that can be strengthened by artificially aging or annealing. There are also heat treatments for diffusing away interfacially enriched elements, described above. In some cases, even the sealing process 808 can involve heating the anodized substrate to high enough temperatures to cause cracking of the anodic coating if the high thermal expansion coefficient material was not incorporated within the anodic coating. A number of manufacturing operations require a thermal cure cycle: for example, an adhesive bond, or a polymer lacquer or seal may require curing. Other manufacturing operations can include baking out hydrogen from the anodized substrate, laser marking the anodized substrate, shrink wrapping the anodized substrate, and/or other suitable heat treatments. In some cases, the thermal treatment can be an expected exposure to heat during the service life of the product. For example, the product can be exposed to heated air in a hot car. Since the anodic coating has the material(s) of high thermal expansive coefficient incorporated therein, the anodic coating will not craze in response to the thermal treatment(s) or exposure(s).

It should be noted that embodiments presented herein could be used to achieve an anodic coating that is resistant to cracking at a predetermined target temperature. For example, particular thermal manufacturing treatments will involve heating the anodized substrates to a particular temperature, or a particular range of temperatures. Therefore, the anodic coating can be designed to be resistant to cracking at the predetermined temperature of a particular thermal treatment. For example, the anodic coating can be designed to resist cracking when exposed to thermal processes that involve exposure to temperatures as low as 80 to 100 degrees Celsius. Other thermal processes involve exposure to higher temperatures, such as about 120 degrees Celsius, about 175 degrees Celsius, or even 200 degrees Celsius, or more. The type and amount of high thermal expansion coefficient material, as well as a final thickness of the anodic coating, can be chosen so as to accomplish such thermal resistance.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not intended to be exhaustive or to limit the embodiments to the precise forms disclosed. It will be apparent to one of ordinary skill in the art that many modifications and variations are possible in view of the above teachings.

What is claimed is:

1. An anodized part, comprising:
an aluminum alloy substrate comprising a first coefficient of thermal expansion;
a sealed anodic oxide coating disposed on the aluminum alloy substrate, the sealed anodic oxide coating comprising a second coefficient of thermal expansion that is less than the first coefficient of thermal expansion, the sealed anodic oxide coating defining a plurality of pores; and
a thermal expansion compensating polymer deposited within the plurality of pores, the thermal expansion compensating polymer comprising a coefficient of thermal expansion greater than the second coefficient of thermal expansion such that the sealed anodic oxide coating comprises an adjusted coefficient of thermal expansion greater than the second coefficient of thermal expansion.

2. The anodized part of claim 1, wherein the thermal expansion compensating polymer comprises at least one of an epoxy or acrylic.

3. The anodized part of claim 1, wherein a deposit thickness of the thermal expansion compensating polymer is 2 micrometers or greater.

4. The anodized part of claim 1, further comprising dye particles that are deposited within the plurality of pores and impart the sealed anodic oxide coating with a predetermined color, wherein the dye particles overlay the thermal expansion compensating polymer.

5. The anodized part of claim 1, wherein the thermal expansion compensating polymer has a varied distribution within the plurality of pores such as to impart the sealed anodic oxide coating with a thermal expansivity gradient.

6. The anodized part of claim 1, wherein the coefficient of thermal expansion of the thermal expansion compensating polymer is less than the first coefficient of thermal expansion.

7. The anodized part of claim 1, wherein the plurality pores of the sealed anodic oxide coating are sealed with a sealant material, the sealant material being different from the thermal expansion compensating polymer.

8. The anodized part of claim 1, wherein the thermal expansion compensating polymer increases as in-plane thermal expansivity of the sealed anodic oxide coating.

* * * * *